UNITED STATES PATENT OFFICE.

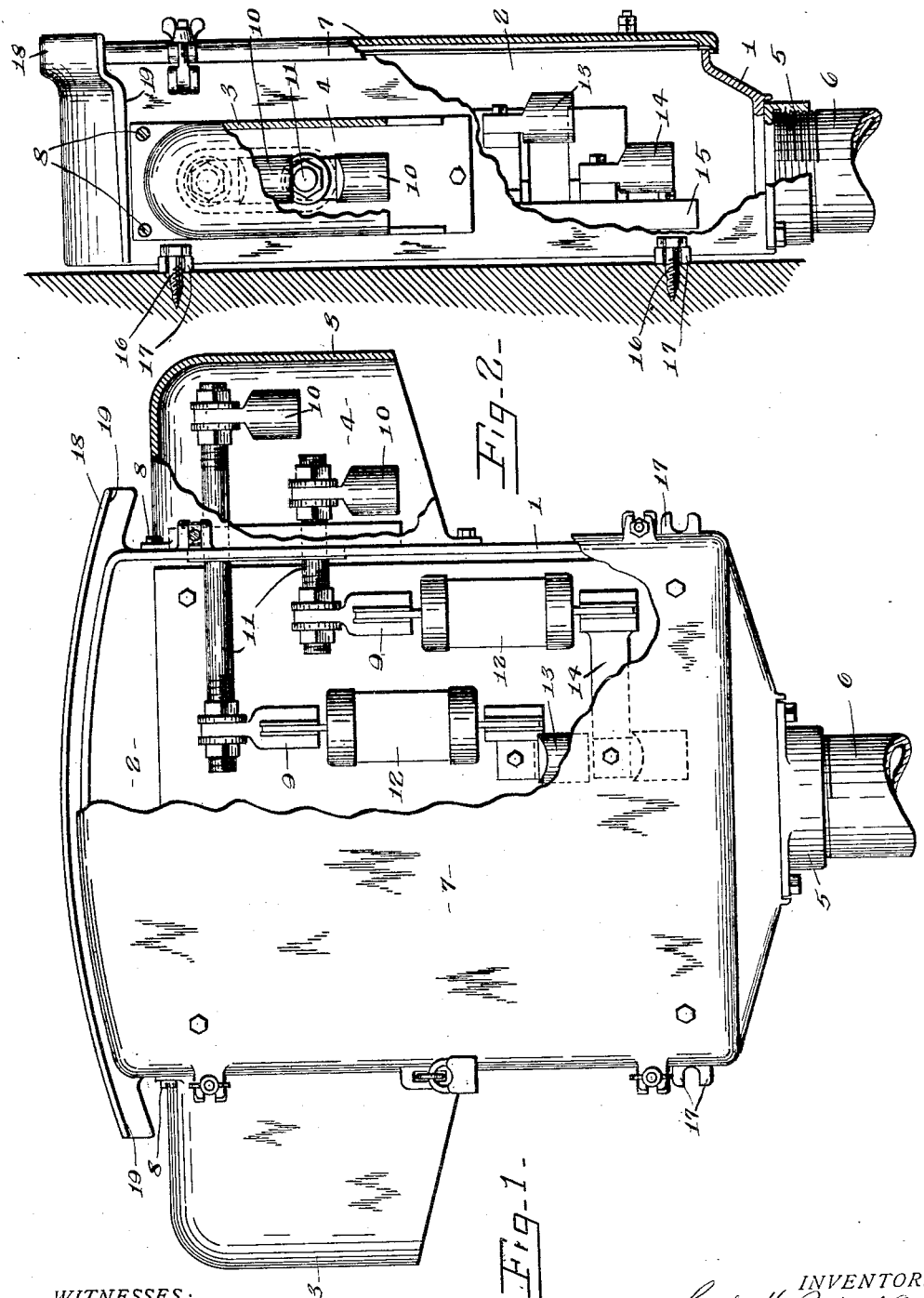

CARL H. BISSELL AND HAROLD P. HASTINGS, OF SYRACUSE, NEW YORK, ASSIGNORS TO CROUSE-HINDS COMPANY, OF SYRACUSE, NEW YORK, A CORPORATION OF NEW YORK.

ELECTRIC SERVICE-BOX.

1,265,293.     Specification of Letters Patent.     Patented May 7, 1918.

Application filed January 25, 1913. Serial No. 744,093.

*To all whom it may concern:*

Be it known that we, CARL H. BISSELL and HAROLD P. HASTINGS, of Syracuse, in the county of Onondaga and State of New York, have invented a certain new and useful Electric Service-Box, of which the following is a specification.

This invention has for its object the production of an electric service box especially applicable for housing the terminals, switches, fuses, etc., in branch circuits leading from the main circuit into a building or factory; and the invention consists in the novel features hereinafter set forth and claimed.

In describing this invention reference is had to the accompanying drawing in which like characters designate corresponding parts in all the views.

Figure 1 is a front elevation, partly broken away, of our service box.

Fig. 2 is a side elevation thereof, partly broken away, the support for the box being also shown in section.

This service box comprises, generally, a main chamber, means for connection with an electric conduit opening into the main chamber, an additional chamber at one side of the main chamber and separated therefrom, terminals in the chambers respectively and conductors connecting the terminals. The conductors are usually rigid members, as rods which support the terminals at their opposite ends.

Our service box is in this embodiment of our invention shown as adapted for a four wire two phase system, and 1 designates the hollow body of the box which incloses a main chamber 2, and 3 are hollow shells on opposite sides of the body 1 and which inclose additional chambers 4.

The body 1 is formed with means as an internally threaded nipple 5 in its bottom for connection with an electric conduit 6 housing the wires leading into a building to be supplied with an electric circuit. The body is also formed with its front side open and the open side is closed by a door 7 held in position in any suitable manner.

The shells 3 are mounted on the upper portions of the side walls of the body 1, and are detachably secured thereto in any suitable manner as by screws 8, each of these shells having one side open for electric wires, and, as here shown, the shells are of less width than said side walls and are open at their lower sides.

9 and 10 are terminal members located respectively within the main chamber 2 and the supplemental chambers 4, these terminals being carried at the opposite ends of rigid conductor rods 11 which extend through the side walls of the box 1 and are supported by said side walls and insulated therefrom. Said side walls of the box 1 thus indirectly support the terminals 9, 10.

The terminals 9 are connected to wires extending in the conduit 6 and the terminals 10 are connected directly to wires extending through the open sides of the shells 3 and leading to the main wires. The terminals 9 are connected to the wires in the conduit 6 through fuses 12 and conductors 13 and 14.

As this is a four wire, two phase system, two of the terminals 9 are connected to one conductor 14, and are also connected through two conductors 11 to wires in the corresponding additional chamber 4. The terminals 13 and 14 are mounted on a suitable base of insulation 15 arranged at the back of the chamber 2.

The service box is secured to a pole or any other support by means of screws 16 passing through lugs 17 into the pole or other support. The roof of the body rounds downwardly toward its ends and its front edge is deflected upwardly and forwardly as at 18 beyond the plane of the inner face of the door 7 to receive and house the upper edge of said door. The opposite side edges of the top terminate in downwardly extending eaves which overhang the side walls of the body and project laterally beyond the planes of the opposing sides of the shells 3; and the tops and outer sides of the shells 3 are formed rounding and the screws 8 by which said shells are secured to the body 1 are under the eaves 19, the whole arrangement being such that the box is water tight and readily sheds water falling thereon.

What we claim is:

1. A service box comprising a hollow body having side walls, an open front, and a movable cover for the front shell having an open bottom, said shell being detachably secured at one side to one of the side walls of the body, terminal members located within the chambers in the body and the shell, and a conductor member extending from the terminal in the chamber of the body through said one of the side walls of the latter and into the chamber in the shell and connected to the terminal located therein, substantially as and for the purpose described.

2. A service box comprising a hollow body having side walls, an open front, and a movable cover for the front, a hollow shell having an opening extending from its internal chamber to the outside of the shell, said shell being detachably secured at one side to one of the side walls of the body, a conductor member carried by and extending through said one of the side walls of the body, and terminals located in the chambers of the body and the shell and carried by the conductor member, substantially as and for the purpose set forth.

3. In a service box and in combination, a substantially rectangular body having side walls, an open front, and a cover for the front secured to one of the side walls, and corresponding shells, one detachably secured at one of its sides to each of said side walls of the body and projecting from the same and having its lower side entirely open, conductor members carried by and extending through said side walls of the body, and terminal members supported by the conductor members and arranged in the chambers of the shells and in the chamber within the body, substantially as and for the purpose specified.

4. In a service box and in combination, a substantially rectangular body having side walls, an open front side and a cover for said open side, shells having rounded upper and outer sides and open lower sides, said shells being of less width than the sides of the body, and means for securing said shells at their opposing sides to the sides of the body, substantially as and for the purpose described.

5. A service box comprising a hollow body having a top, side walls, an opening in one of its walls disposed at an angle to said side walls, and a closure for the opening, a hollow shell having an opening extending from its internal chamber to the outside of the shell, said shell being detachably secured at one side to one of the side walls of the body, and one end of the top being extended laterally beyond the plane of the contiguous side of the shell, and terminal members supported by said one of the side walls of the body and located in the internal chambers of the body and the shell, substantially as set forth.

6. A service box comprising a hollow body having a top, side walls, an opening in one of its walls disposed at an angle to said side walls, and a closure for the opening, hollow shells arranged at opposite sides of the body and detachably secured to said side walls and formed of less width than said side walls, said shells having openings therein leading from their internal chambers for the passage of wires, the ends of the top being extended downwardly and laterally beyond the planes of the opposing walls of the shells, and terminal members supported by said opposite sides of the body and located in the internal chambers of the body and the shells, substantially as and for the purpose set forth.

7. A service box comprising a hollow body having a top, side walls, an opening in its front wall, and a closure for the opening, a hollow shell having an opening extending from its internal chamber to the outside of the shell, said shell being detachably secured at one side to one of the side walls of the body, the front of the top being extended forwardly beyond the plane of the inner face of the closure, and one end of the top being extended laterally beyond the plane of the contiguous side of the shell, and terminal members supported by said one of the side walls of the body and located in the internal chambers of the body and the shell, substantially as and for the purpose specified.

8. A service box comprising a hollow body having a top extending downwardly toward its ends, side walls, an opening in its front wall, and a closure for the opening, hollow shells arranged at opposite sides of the body and detachably secured to said side walls and formed of less width than said side walls, the shells having openings in their lower portions for the passage of wires, the front of the top being extended upwardly and forwardly beyond the plane of the inner face of the closure, and the ends of the top being extended downwardly and laterally beyond the planes of the opposing walls of the shells, and terminal members supported by the side walls of the body and arranged in the internal chambers of the body and the shells, substantially as and for the purpose set forth.

In testimony whereof, we have hereunto signed our names in the presence of two attesting witnesses, at Syracuse, in the county of Onondaga, in the State of New York, this 21st day of January, 1913.

CARL H. BISSELL.
   HAROLD P. HASTINGS.

Witnesses:
 M. E. MAHAR,
 E. D. LOW.

Copies of this patent may be obtained for five cents each, by addressing the "Commissioner of Patents, Washington, D. C."

It is hereby certified that in Letters Patent No. 1,265,293, granted May 7, 1918, upon the application of Carl H. Bissell and Harold P. Hastings, of Syracuse, New York, for an improvement in "Electric Service-Boxes," an error appears in the printed specification requiring correction as follows: Page 1, line 104, claim 1, before the word "shell" insert the article *a*; and that the said Letters Patent should be read with this correction therein that the same may conform to the record of the case in the Patent Office.

Signed and sealed this 30th day of July, A. D., 1918.

[SEAL.]

R. F. WHITEHEAD,
*Acting Commissioner of Patents.*

Cl 247—12.